Patented June 24, 1952

2,601,669

UNITED STATES PATENT OFFICE 2,601,669

STABILIZED BARIUM AND STRONTIUM LITHOL TONERS

Volney Tullsen, Westfield, N. J., assignor to American Cyanamid Company, New York, N. Y., a corporation of Maine No Drawing. Application September 30, 1950, Serial No. 187,834

3 Claims. (Cl. 260—195)

This invention relates to new physical forms of barium and strontium lithol toners and to processes of preparing them.

One of the most important recent developments in the printing ink field has been the introduction of so-called vapor setting inks, which dry by precipitation on contact with moisture. These inks are formulated with a high-boiling water-soluble vehicle, such as diethylene glycol, and special synthetic resins which are soluble in the vehicle but lose their solubility when the solvent is diluted with water. The inks are printed in the usual manner, and then exposed to steam water vapor or (in some cases) simply to the ordinary moisture of the atmosphere. The resulting dilution of the vehicle causes precipitation and setting.

These inks offer striking practical advantages, including cleanness and brilliance of color, freedom from odor, and fast setting, and consequently have found widespread use in a number of important applications. Nevertheless their adoption has been hindered by the serious drawback that certain of the most important known pigments have not proved well suited for use in vapor setting formulations, but create serious practical difficulties when such use is attempted.

One of the most important types of pigments are the so-called lithol toners, which are prepared by diazotizing Tobias acid (2-naphthylamine-1-sulfonic acid) and coupling with beta-naphthol. For shading purposes, the Tobias acid is frequently mixed with a portion of another amino sulfonic acid, such as 1-naphthylamine-2-sulfonic acid. These colors are usually employed in the form of their alkaline earth metal lakes. Unfortunately when these lakes are incorporated in vapor setting inks, they exhibit a serious color instability and also show a strong tendency to cause the ink to "body," or gain in viscosity. For example, barium lithols shift color from the desired bright red to a dull orange shade, and the ink increases in viscosity until it becomes useless and is practically semi-solid.

According to the present invention it is found that the barium and strontium lithol toners may be transformed into a different physical form in which they no longer show any change in color when incorporated into vapor setting inks and stored, and do not tend to cause the ink to body. There does not appear to be a change in the chemical constitution but the crystal structure is different, and this is shown by differences in the X-ray diffraction patterns obtained from the powdered pigments. Thus the new barium lakes show a doublet line corresponding to an interplanar spacing of 3.39 and 3.53 Å. in place of a single line in the unstable product at about 3.47 Å. There also appears a doublet in the stable lakes at about 4.22 and 4.37 Å., in which region the unstable pigment shows no diffraction pattern lines. A third difference, which while definite is somewhat less striking, is the shift of the doublet in the unstable form from 5.7 and 6.1 Å. to 5.5 and 5.9 Å. in the stable form. The stable strontium lake shows a similar change in diffraction pattern, the single line at 3.04 Å. in the unstable being replaced by a doublet at 2.83 and 2.94 Å. in the stable form. The single line at 3.42 Å. in the unstable lake is replaced by a doublet at 3.35 and 3.48 Å. and a strong line at 4.33 Å. in the unstable lake is transformed into a somewhat weaker doublet at 4.18 and 4.30 Å. Another difference, though not so striking, is the shift of a strong line at 8.7 Å. in the unstable lake to 8.2 Å. in the stable form.

Throughout the specification and claims the term "lithol toners" will be used to denote lakes of the azo dyes obtained by coupling beta-naphthol with a diazo compound having diazotized Tobias acid as its major constituent.

It is not intended to limit the products of the present invention to any particular process. However, in a narrower aspect, certain preferred processes constitute a part of the present invention. Essentially these processes comprise heating the unstable barium and strontium lithol toners in formamide. The process starts when the temperature is raised above room temperature, but is too slow for economical practical use below 50° C. At higher temperatures the change is more rapid, but of course, the temperature must be kept below that at which the solvent or the pigment starts to decompose.

As with most transformations of organic pigments, the time required for composition will vary with the temperature. At higher temperatures the time is much shorter, the minimum time being about ten minutes for practical operation at maximum temperature. Inasmuch as longer heating, within reason, does not damage the stabilized toner, it is usually desirable to heat for a little longer than the absolute minimum time, as the change can be made to work at any temperature. It is important in practical operations to be sure that the physical change to the stable crystal form is complete. Such a procedure requires a minimum of critical control, which is a practical operating advantage.

It is another advantage of the present invention that the amount of solvent is not critical. Of course, it is necessary to use sufficient solvent to thoroughly wet the pigment. Somewhat larger amounts of solvent, for example, an amount equal to the weight of the pigment, would give better operating conditions since it would permit stirring which, though not essential, is desirable. Larger amounts of solvent do no harm but as they do not improve the results they are normally not as desirable for excessively large amounts will increase the cost of operation.

For most purposes, however, it is desirable to market a dry pigment, and this may be accomplished easily by filtering the pigment after stabilization, washing it with water, and drying. It is an advantage of the present invention that once stabilized the lithol toner can be kept indefinitely without losing its desirable properties.

The invention will be described in greater detail in conjunction with the following specific examples, the parts being by weight.

*Example 1*

Ten parts of a barium lake from the azo dye obtained by coupling diazotized Tobias acid with beta-naphthol are mixed with 35 parts of formamide and heated for about a day at 80° C. producing a suspension of barium lithol toner which shows the crystal structure defined by the X-ray diffraction pattern described above as typical of the stable pigment.

The pigment when incorporated into a vapor setting ink is stable on storage and neither the color nor the viscosity of the ink change. If an ink is prepared with the same barium lake but without heating in formamide, its color shifts to a dull orange shade on storage and serious bodying takes place.

*Example 2*

The procedure of Example 1 is followed substituting the strontium lithol toner for the barium lithol toner. The product obtained has the X-ray diffraction pattern of the stable pigment and shows high resistance to change in color and viscosity on storage.

This application is in part a continuation of my application, Serial No. 118,177, filed September 27, 1949.

I claim:

1. A process of transforming an unstable lithol toner, selected from the group consisting of barium and strontium lithol toners, into a stable form which comprises heating the toner in formamide at a temperature ranging from slightly above room temperature to below the decomposition point of the toner, until transformation into the stable crystal structure is substantially complete.

2. A process according to claim 1 in which the unstable lithol toner is a barium lithol toner.

3. A process according to claim 1 in which the unstable lithol toner is a strontium lithol toner.

VOLNEY TULLSEN.

REFERENCES CITED

The following references are of record in the file of this patent:

UNITED STATES PATENTS

| Number | Name | Date |
|---|---|---|
| 2,028,959 | Todd et al. | Jan. 28, 1936 |
| 2,174,501 | Reich | Sept. 26, 1939 |
| 2,435,769 | Cheyney et al. | Feb. 10, 1948 |
| 2,447,394 | Candee | Aug. 17, 1948 |